July 11, 1939.  W. STEIN ET AL  2,165,516
MINNOW CATCHER
Filed March 30, 1938
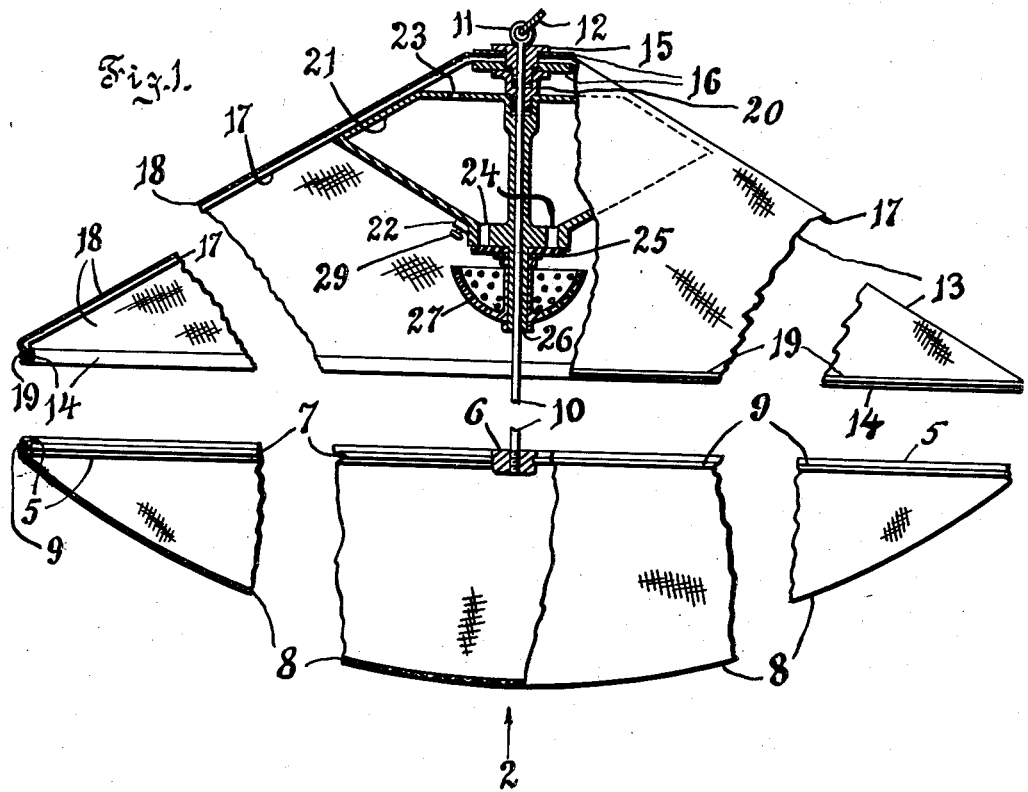
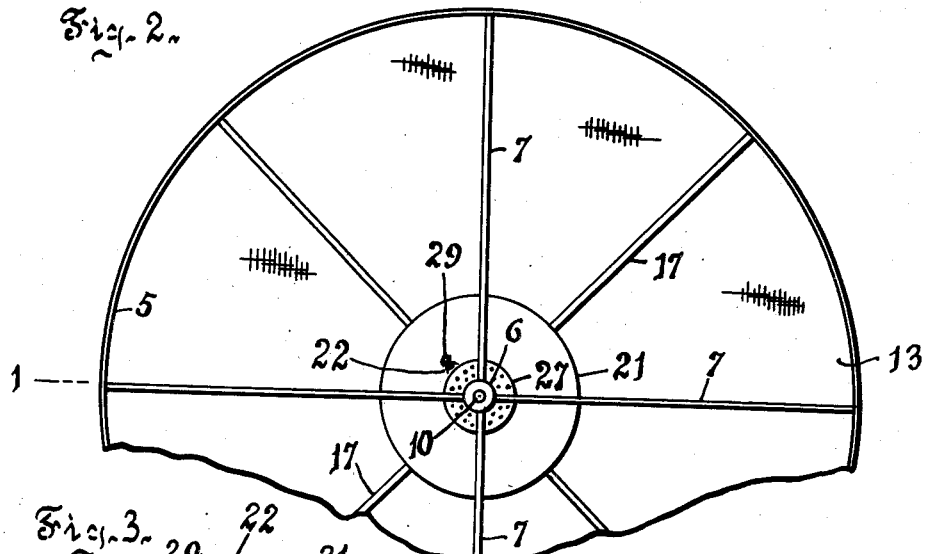
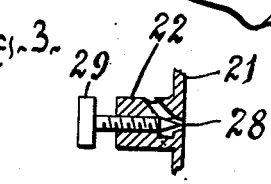
INVENTOR
W. Stein
BY N. C. Price
ATTORNEY

Patented July 11, 1939

2,165,516

UNITED STATES PATENT OFFICE 2,165,516

MINNOW CATCHER

William Stein and Romaine Charles Price, New York, N. Y.

Application March 30, 1938, Serial No. 198,808

9 Claims. (Cl. 43—105)

Our invention relates to minnow catchers, and has reference particularly to a pair of relatively movable nets adapted to form a closed netted container between which is located the bait for attracting minnows.

Another feature of the invention is to provide one of the nets of the catcher with a float, the buoyancy of which decreases gradually, thus permitting the two nets to close after an interval of time, without any intervention by the operator.

Another feature of the invention is to restore the buoyancy of the float as the catcher is removed from the water, so that it is ready for another operation.

An object of the invention is to provide a simple and efficient automatic minnow catcher.

In the appended drawing forming part of the application, Figure 1 is an enlarged fragmented section on line 1—1, Figure 2.

Figure 2 is a view in the direction of the arrow 2, with the fabric of the lower net removed and the upper net turned through 45 degrees, to better illustrate the same, and Figure 3 is a sectional view through the needle valve of the float.

Referring to the drawing, 5 is the rim of the lower net connected to the hub 6 by radial spokes 7. The fabric 8 which forms the net is hanging from the rim to which it is attached by a hoop 9, for which the rim 5 has a circumferential groove. Rising from the hub 6 is a stem 10 to which hub it is connected removably; the stem 10 at its free end is provided with an opening 11 to engage a cable 12 by means of which the stem with everything carried by it may be lowered or raised.

Slidably mounted on the stem 10 is a substantially cone-shaped net 13, the base of which net is formed by a rim 14 of substantially the same diameter as the rim 5, but without radial spokes. At its apex, the net 13 carries a flanged bushing 15, which is slidably mounted on the stem 10. On this bushing are mounted a pair of washers 16, to which spokes 17 are secured at one end, the other end of the spokes being secured to the rim 14. These spokes and the rim 14 define the shape of the net 13. The netted fabric 18 is conically shaped so that its larger diameter is maintained on the rim 14 by a hoop 19. At the apex, the fabric 18 is cut to permit the entrance of the bushing 15, and thereat it is secured between the washers 16. The fabric may or may not be secured along the spokes 17.

The washers, the spokes and the fabric are retained on the bushing by a member 20, which locks the assembly of the washers, the spokes and the fabric on the bushing 15. In other words, the net 13 is carried by the bushing 15.

A float 21, slidably mounted on the stem 10, is suspended from the retaining member 20, and preferably it is tapered so that it will fit against the spokes 17 in the proximity of the upper part of the net 13. The bottom part of the float within the net 13 is preferably tapered toward the stem 10, so that the float 21 may be said to be formed of two frusto-conical shaped members united at their bases to form a unit.

The float 21 is of hollow construction, and at its lower part within the net 13, it has a needle valve 22 through which water may seep into the float. At its upper part, the float 21 has an air vent 23 through which the air may escape when water enters into the float through the needle valve 22.

In addition, the float 21 at its very bottom within the net 13 has apertures 24 controlled by a flap valve 25, which closes automatically when the flap strikes water and opens automatically when the bottom of the float leaves the water, thus in the first instance preventing water entering through the apertures 24, and in the second instance permitting water to escape that has accumulated within the float by seeping through the needle valve.

Suspended from an extension 26 of the float 21 is a bait container 27 which is preferably in the shape of a perforated cup.

It may be remarked here that the buoyancy of the float 21 is greater than that necessary to support the net 13 with its appurtenances, that slide with it as a unit, but it is not sufficient to buoy the entire catcher. In consequence, the two nets, mounted as shown in Figure 1, when thrown into water by means of the cable 12 will sink, though the upper net 13, due to the presence of the float, will be maintained spaced from the lower net although it is immersed. As the water enters gradually through the needle valve 22 into the float 21, its buoyancy decreases and in consequence thereof, the net 13 begins to gradually move on the stem 10 toward the lower net until the rim 14 rests on the rim 5, thus forming a closed netted compartment in which are entrapped any minnows that may feed between the two nets. The time which the upper net will take to move upon the lower net may be controlled by adjusting the opening 28 controlled by the needle 29 of the valve 22.

In cases where it is desirable to prevent the movement of the upper net toward the lower net, it is only necessary to shut off the orifice 28, in which case the upper net 13 will remain spaced from the lower net when both are submerged or immersed, and the only way to close the two nets is by pulling the lower net to the upper net. It is self-evident that such a case may arise in shallow water, where for some reason it is not desirable to vary the buoyancy of the float.

From the above description, it will be seen that in our device the two relatively movable nets are permitted to automatically and gradually close by the varying buoyancy of one of the nets and restoring that buoyancy as soon as the catcher has been raised above the surface of the water.

We claim:

1. A minnow catcher, comprising a net having a rising stem from which it may be suspended, a second net slidably mounted on said stem and adapted to close the first net, a bait receptacle between said nets and a float for said second net for maintaining it above the first, the buoyancy of said float being more than sufficient for the second net but insufficient for floating both nets.

2. A minnow catcher, comprising a net having a rising stem from which it may be suspended, a second net slidably mounted on said stem and adapted to close the first net, a bait receptacle between said nets, and a float for said second net for normally maintaining it above the first, said float having means to lose its buoyancy to permit the second net to close the first, and means for restoring the buoyancy of the float.

3. A minnow catcher, comprising a net having a rising stem from which it may be suspended, a second net slidably mounted on said stem and adapted to close the first net, a bait receptacle between said nets, a hollow float for said second net for maintaining it above the first, means for admitting water into said float whereby its buoyancy may be decreased, and means for letting the water out of the float to restore its buoyancy.

4. A minnow catcher, comprising a net having a rising stem from which it may be suspended, a second net of conical shape slidably mounted on said stem and adapted to close the first net, a float for said conical net, a bait receptacle suspended from said float, said float having a buoyancy sufficient to support the second net with the receptacle above the first when the two are immersed, means associated with said float for decreasing its buoyancy gradually, whereby the second net is adapted to engage the first net and close it, and means for automatically restoring the buoyancy of the float when it is removed from water.

5. A minnow catcher, comprising a pair of relatively movable nets, a bait container positioned between the nets, and a float for maintaining the two nets in spaced relation when immersed.

6. A minnow catcher, comprising a pair of relatively movable nets, a bait container positioned between the two nets, a float for maintaining the two nets in spaced relation when they are immersed, and means associated with the float whereby its buoyancy may be gradually decreased while immersed and whereby the two nets are permitted to come into contact.

7. A minnow catcher, comprising a pair of relatively movable nets, a bait container positioned between the two nets, a float for maintaining the two nets in spaced relation when immersed, means associated with said float for gradually reducing its buoyancy whereby the nets are permitted to come together after a predetermined time interval, and means for restoring the buoyancy of the float to its normal buoyancy when the catcher is removed from the water.

8. A minnow catcher, comprising a net having a rising stem from which it may be suspended, a second net of conical shape slidably mounted on said stem and adapted to close the first net, a float associated with said conical net, a bait container suspended from said float, said float having an air vent at the top thereof, means at the bottom of the float for preventing water entering into the float when the float is immersed but permitting water to leave the float when the float is above the surface of the water, and a needle valve in said float between the air vent and the said means.

9. A minnow catcher, comprising a net having a rising stem from which it may be suspended, a conically shaped net slidably mounted on said stem and adapted to close the first net, a float for the conical net, a bait receptacle suspended from said float, said float having a buoyancy sufficient to support the second net with the receptacle and being provided with an air vent at the top thereof, a flap valve at the bottom of the float for preventing water from entering into the float when the same is immersed but permitting water to leave the float when the float is removed from the water, and a needle valve in the float between the air vent and the flap valve whereby the buoyancy of the float may be varied substantially as described.

WILLIAM STEIN.
ROMAINE C. PRICE.